United States Patent
Smith, III et al.

(10) Patent No.: US 9,644,863 B2
(45) Date of Patent: May 9, 2017

(54) FORCED AIR HEATER WITH DUAL AIR MOVERS

(71) Applicant: Pinnacle Products International, Inc., Yardley, PA (US)

(72) Inventors: Anderson Quillian Smith, III, York, PA (US); Kyu Sam Hwang, Gyenggi-Do (KR); Sung Geun Lee, Gyenggi-Do (KR); Chang Won Kim, Gyenggi-Do (KR)

(73) Assignee: PINNACLE CLIMATE TECHNOLOGIES, INC., Yardley, PA (US)

( * ) Notice: Subject to any disclaimer, the term of this patent is extended or adjusted under 35 U.S.C. 154(b) by 366 days.

(21) Appl. No.: 14/049,799

(22) Filed: Oct. 9, 2013

(65) Prior Publication Data

US 2014/0099592 A1    Apr. 10, 2014

Related U.S. Application Data (60) Provisional application No. 61/711,624, filed on Oct. 9, 2012.

(51) Int. Cl.
  *F24H 3/04*    (2006.01)
  *F24H 9/18*    (2006.01)
  *F24H 9/00*    (2006.01)

(52) U.S. Cl.
  CPC ......... *F24H 3/0488* (2013.01); *F24H 9/0073* (2013.01); *F24H 9/1881* (2013.01)

(58) Field of Classification Search
  CPC .... F24H 3/0488; F24H 9/1881; F24H 9/0073; F23D 11/001; F23D 11/404; F23D 14/36; F23D 14/78; F23L 15/02
  See application file for complete search history.

(56) References Cited

U.S. PATENT DOCUMENTS

| | | | | |
|---|---|---|---|---|
| 2,651,514 | A * | 9/1953 | Sherman | F23D 11/001 432/223 |
| 3,298,418 | A * | 1/1967 | Briggs | F23D 11/00 431/238 |
| 4,089,642 | A | 5/1978 | Briggs | |
| 4,340,362 | A | 7/1982 | Chalupsky | |
| 4,519,772 | A * | 5/1985 | Mittmann | B60H 1/2206 237/12.3 C |
| 4,613,072 | A * | 9/1986 | Kikuchi | B60H 1/2209 122/448.1 |

(Continued)

FOREIGN PATENT DOCUMENTS

| | | |
|---|---|---|
| DE | 1948095 U | 10/1966 |
| GB | 2156966 A | 10/1985 |
| WO | 9119905 A1 | 12/1991 |

OTHER PUBLICATIONS

International Search Report and Written Opinion for PCT Application No. PCT/US13/64014, dated Mar. 7, 2014.

*Primary Examiner* — Steven B McAllister
*Assistant Examiner* — Steven Anderson, II
(74) *Attorney, Agent, or Firm* — Lucas & Mercanti, LLP (57) ABSTRACT

A forced air heater that includes two air moving devices for improved control of air and fuel mixture for combustion, and improved air flow the heater. In addition to better air flow, the heater includes an improved fuel system that utilizes a pump and delivery controls to accommodate reduced air flow while avoiding incomplete combustion and fume odors.

11 Claims, 8 Drawing Sheets

(56) References Cited

U.S. PATENT DOCUMENTS

| | | | |
|---|---|---|---|
| 4,651,711 | A | 3/1987 | Velie |
| 4,822,258 | A | 4/1989 | Matsuda et al. |
| 4,848,313 | A | 7/1989 | Velie |
| 5,307,800 | A | 5/1994 | Lee, Jr. |
| 5,427,086 | A | 6/1995 | Brownell |
| 5,567,144 | A | 10/1996 | McCoy |
| 5,867,996 | A | 2/1999 | Takano et al. |
| 5,904,042 | A * | 5/1999 | Rohrbaugh ............ F01N 3/0211 422/171 |
| 6,142,141 | A | 11/2000 | Long |
| 6,684,944 | B1 | 2/2004 | Byrnes et al. |
| 8,068,724 | B2 | 11/2011 | Vandrak et al. |
| 8,146,583 | B1 | 4/2012 | Lee, Jr. |
| 8,201,551 | B1 | 6/2012 | Lee, Jr. |
| D663,812 | S | 7/2012 | Cassell et al. |
| D663,813 | S | 7/2012 | Cassell et al. |
| D663,814 | S | 7/2012 | Cassell et al. |
| D663,815 | S | 7/2012 | Cassell et al. |
| 2008/0115781 | A1* | 5/2008 | Vancak ................... F23C 3/002 126/91 A |
| 2008/0302351 | A1 | 12/2008 | Hunter et al. |
| 2009/0008465 | A1* | 1/2009 | Fiumidinisi ........... F23D 11/001 237/19 |
| 2010/0000508 | A1* | 1/2010 | Chandler ................ F24H 1/06 126/116 R |
| 2011/0265779 | A1 | 11/2011 | Vandrak et al. |

\* cited by examiner

FORCED AIR HEATER WITH DUAL AIR MOVERS

This application claims the benefit of U.S. Provisional Application No. 61/711,624, which was filed Oct. 9, 2012 and is incorporated herein by reference as if fully set forth.

FIELD OF INVENTION

This application generally relates to forced air heaters, and more particularly to a forced air heater with twin air movers that control the flow of air through and over the heater combustion chamber.

BACKGROUND

Typically a forced air heater involves the use of a fan for pulling ambient air through and over the combustion chamber. As the air flows through the chamber, it is introduced to a fuel source and an ignition source. The ignition source, commonly a spark plug, combusts the fuel to release heat into the air flow.

Some forced air heaters are only capable of delivering a single speed air flow. While effective for some heating purposes, a single air flow inside a forced air heater does not offer the desired control of the air flow through the heater. This can produce an uncomfortable condition in the area heated by the forced air heater as the space can become too hot and dry. Simply turning off the forced air heater is not really a viable solution as it allows cold temperatures to quickly penetrate the area. Additionally, reducing the air flow can result in incomplete combustion, unburned fuel, and fumes.

There exist a need for a forced air heater with improved fuel delivery and air flow control through and over the heater combustion chamber.

SUMMARY

The disclosed forced air heater includes two air moving devices. A first air moving device at a first axial end of the housing is provided to primarily direct the air through an annular space defined between the outer surface of the combustion chamber and the inner surface of the housing. The air heated by the combustion chamber is directed out of the heater through a second axial end of the housing. A second air moving device is provided for supplying air directly to the combustion chamber. The second air moving device has an intake port and an outlet port that both face the combustion chamber. The inlet port draws air into the second air moving device. The outlet port moves air into a duct that directs the air into the combustion chamber. The first air moving device primarily directs heated air out of the heater. In addition to better air flow, a preferred heater includes a pump and delivery controls that accommodate reduced air flow and avoids incomplete combustion and fume odors.

BRIEF DESCRIPTION OF THE DRAWINGS

The invention is described in more detail with reference to the accompanying drawings.

DETAILED DESCRIPTION OF THE PREFERRED EMBODIMENTS

Figure 1:
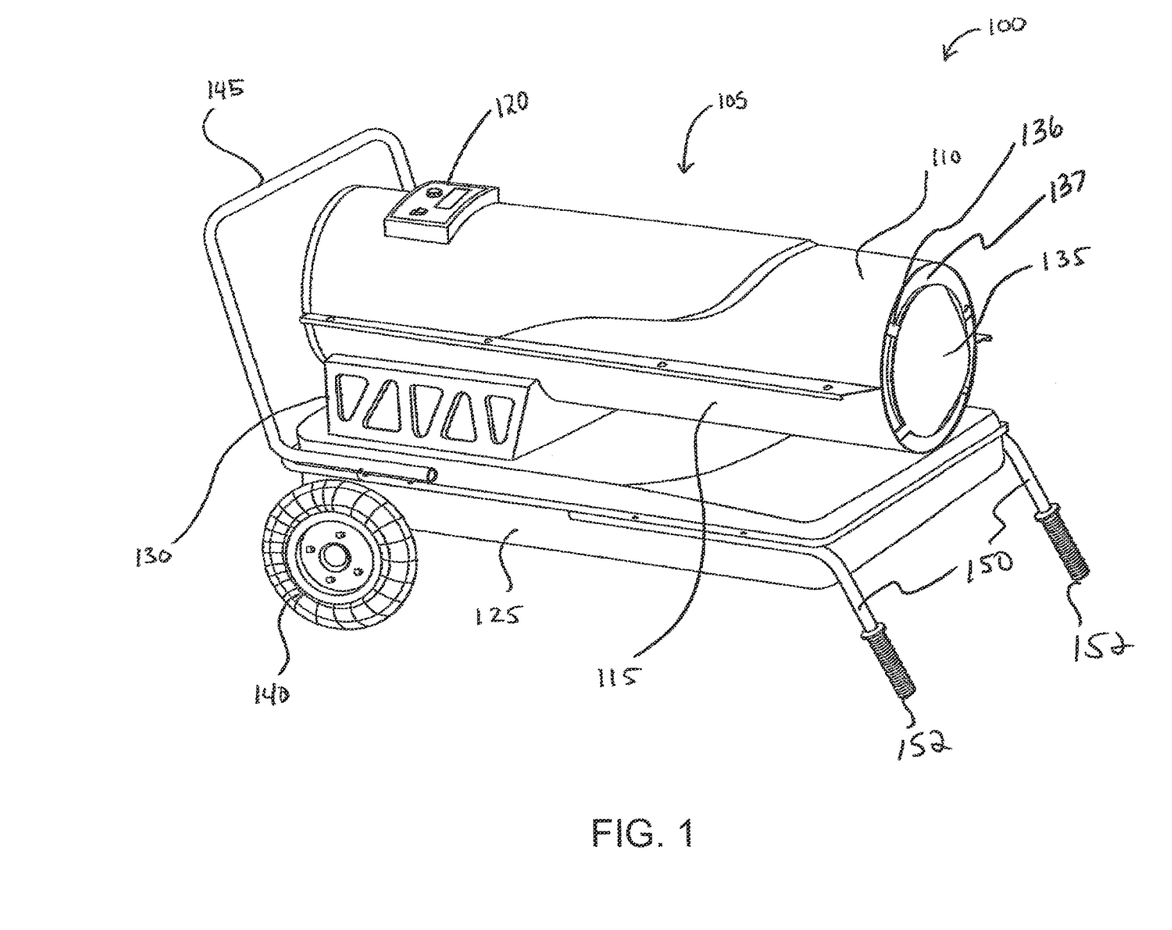
FIG. 1 is a perspective view of the forced air heater according to the invention.

Referring to FIG. 1, there is shown a forced air heater 100 that includes a housing 105 that is comprised of an upper shell 110 and a bottom shell 115. The upper shell 110 is detachable for servicing of the forced air heater 100. A control panel 120 is located on the upper shell 110. The housing 105 is mounted on a support structure 130 that rests on a fuel tank 125. A deflector 135 attaches over the air exhaust end of the forced air heater 100. The deflector 135 includes a center deflection plate and a plurality of tabs 136 for connecting to the housing 105. An annular space 137 is defined between a radially inner surface of the housing 105 and a radially outer surface of a combustion chamber 500, see FIG. 2. As explained in more detail below, an air moving device provides airflow through this annular space 137.

Figure 3:
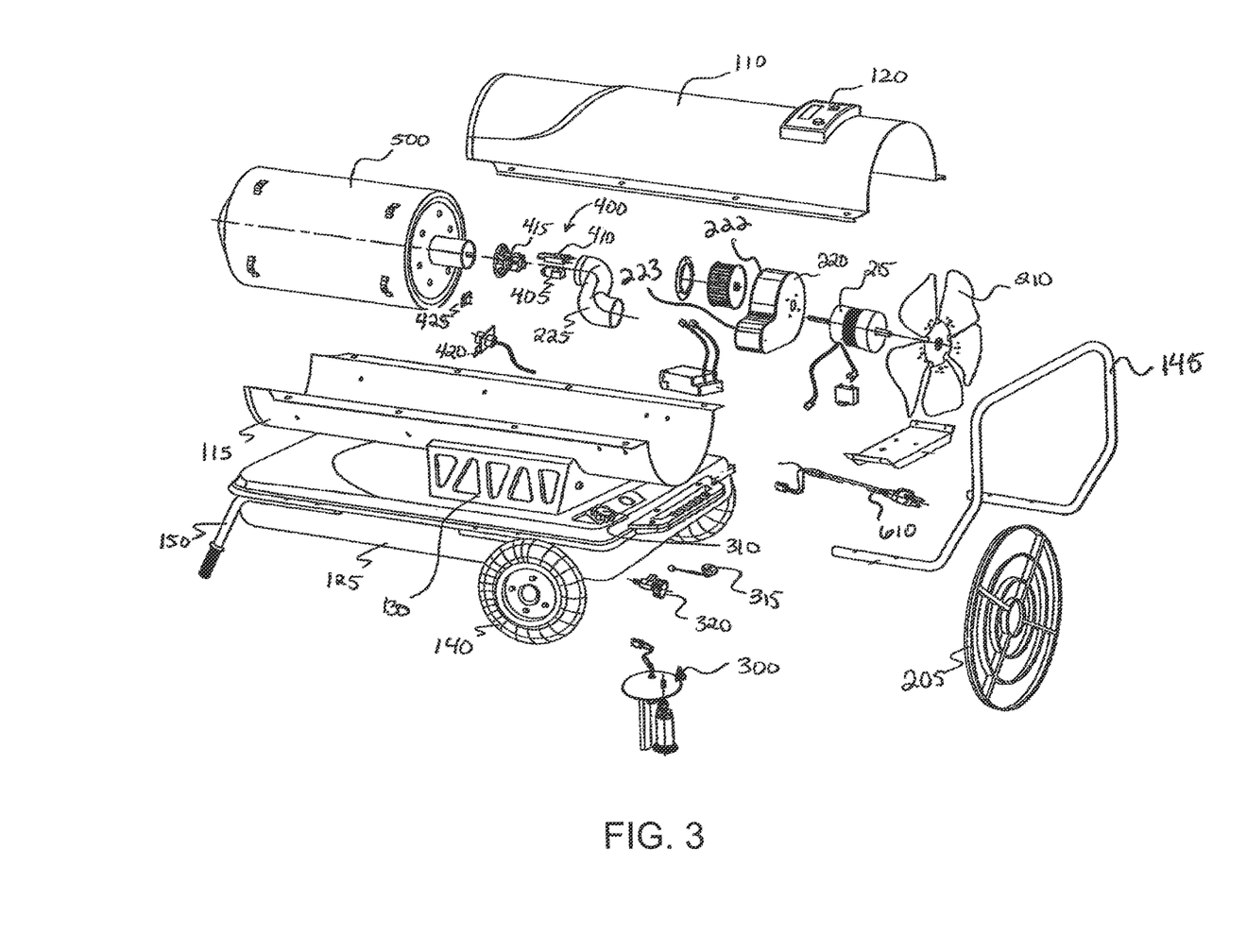
FIG. 3 is a further exploded view of a forced air heater according to the invention.

In one embodiment, the heater 100 is made transportable by the inclusion of a handle 145, hand grips 150, and wheels 140, see FIGS. 1 and 3. The hand grips 150 include caps 152 that provide gripping surfaces during transport and help keep the heater 100 in place when it is at rest.

Figure 2:
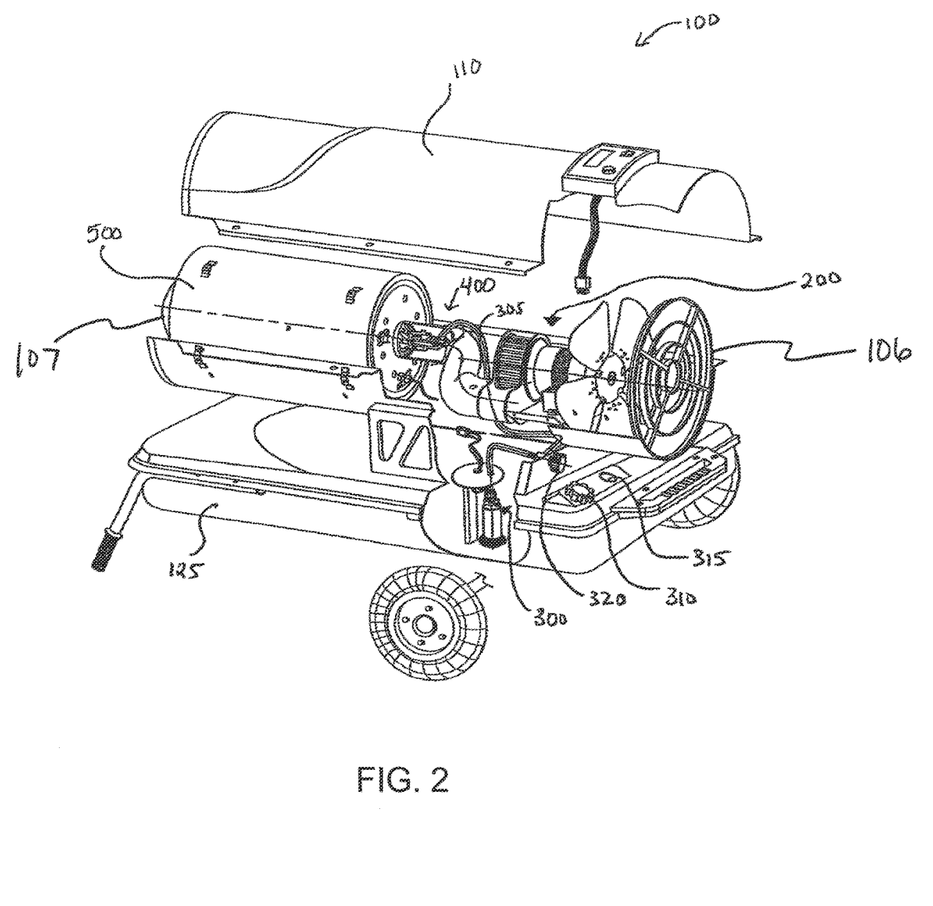
FIG. 2 is an exploded view of the forced air heater in FIG. 1.

Referring to FIG. 2, there is shown a view of the forced air heater 100 with the upper shell 110 of the housing 105 pulled away from the heater 100 to reveal the internal components. A portion of the fuel tank 125 has also been cutaway in FIG. 2 to show a preferred fuel supply system 300. The forced air heater 100 comprises an air system 200, the fuel supply system 300, an ignition system 400, and the combustion chamber 500. Air is drawn into the forced air heater 100 at a first axial end 106 of the housing 105 by the air system 200. Owing to dual air moving devices, the air system 200 directs air towards a second axial end 107 of the housing 105 towards the ignition system 400 and the combustion chamber 500. By providing two separate airflows, the heater 100 provides improved control of heat output. The fuel supply system 300 pumps fuel from the fuel tank 125 to the ignition system 400, via a fuel line 305, where fuel mixes with air, ignites, and expands into the combustion chamber 500 while burning.

Figure 4A:
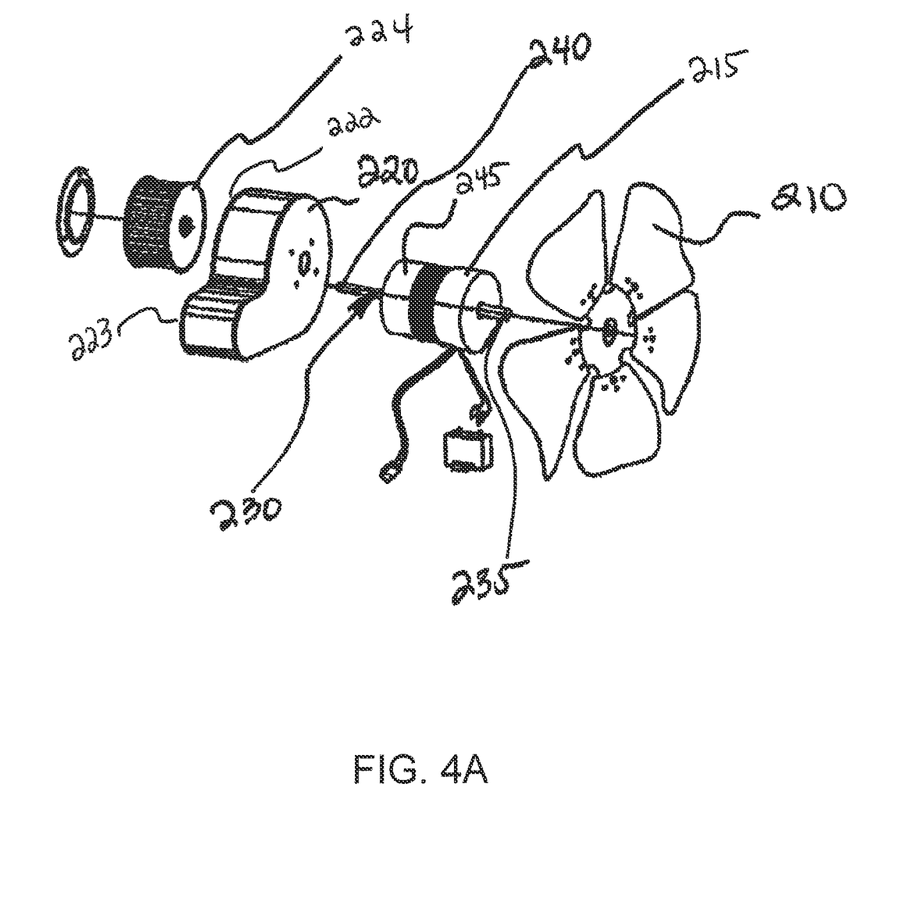
FIG. 4A is an exploded, detailed view of air moving devices according to the invention.

Referring to FIGS. 2, 3, and 4A, there is shown an exploded view of the internal components found inside the housing 105 of a preferred embodiment of the forced air heater 100. FIG. 3 focuses on the air system 200 components and the ignition system 400 components. As more clearly shown in FIGS. 2 and 4A, the air system 200 is further comprised of a fan guard 205, a first air moving device 210, a motor 215, a second air moving device 220, and an air duct 225. The first air moving device 210 is located at the first axial end 106 of the housing 105. The motor 215 is driven by a power source, such as an AC power source via a plug 610 or a battery 605. Air is drawn into the first axial end 106 of the housing 105 by the first air moving device 210 and a portion of that air is drawn into an inlet 222 of the second air moving device 220 for movement into the combustion chamber 500. The remainder of the air continues through the forced air heater 100, into the annular space 137 around the combustion chamber 500, towards the second axial end 107 of the housing 105, and out to the area to be heated.

In one embodiment, the first air moving device 210 is a blade fan and the second air moving device 220 is a squirrel cage blower, or Sirroco fan. The first air moving device 210 is a commonly known blade fan with a plurality of blades. Suitable squirrel cage blowers 220 are available from Grainger Industrial Supply, Lake Forest, Ill. The squirrel cage blower 220 has an air intake port 222, an air outlet port 223, and an internal air mover 224. The air mover 224 draws air into intake port 222 and the outlet port 223 moves air into the air duct 225, which directs the airflow into the combustion chamber 500. The air duct 225 is shaped to direct the full output of air from the squirrel cage blower 220 into the combustion chamber 500. In a preferred embodiment, the air duct 225 is configured to direct the air into a central portion of the combustion chamber 500. The air duct 225 can be a rigid elbow shaped duct, a flexible tube, or hose that can be shaped to direct air from the second air moving device 220 into the combustion chamber 500. It will be recognized that the configuration of the air mover will determine whether an air duct 225 is necessary and, if necessary, the shape that is required to deliver the air to a central location of the combustion chamber.

The first and second air moving devices 210, 220 are driven by a common drive shaft 230 in the motor 215. In a preferred embodiment, the first air moving device 210 is located on one side of the motor 215, and the second air moving device 220 is located on an opposite side of the motor 215. Each air moving device 210, 220 is secured to a respective end 235, 240 of the drive shaft 230 so that they rotate about a common axis. In one embodiment, the motor 215 rotates the entire shaft 230 at a single speed, and the first and second air moving devices 210, 220 are driven at the same speed. In another embodiment, the shaft 230 is segmented and the assembly includes a clutch assembly 245 which allows the first end of the shaft 235 to rotate at a first speed, and the second end of the shaft 240 to rotate at a second, different speed, see FIG. 4A. In another embodiment, the clutch assembly 245 is located between the motor 215 and the second air moving device 220. In one embodiment, the first air moving device 210 is driven directly by the motor 215 via the drive shaft 230. On an opposite side of the motor 215, the clutch assembly 245 reduces the output from the motor 215 being provided to the second air moving device 220 via the drive shaft 230, such that the second air moving device 220 rotates at a lower speed than the first air moving device 210. The clutch assembly 245 can be located on either side of the motor 215, either between the motor 215 and the second air moving device 220, or between the motor 215 and the first air moving device 210.

The clutch assembly 245 can be self-actuating or actuated by the power source, such that the clutch assembly 245 can be variably engaged or disengaged via the control panel 120. The motor 215 is controlled via the control panel 120. In those embodiments of the air system 200 having a variable speed motor, the speed of the motor 215 can also be controlled via the control panel 120. The individual speeds of the first and second air moving devices 210, 220 can also be adjusted via the control panel 120. In another embodiment, two motors can be provided, with a first motor driving a first shaft connected to the first air moving device 210, and a second motor driving a second shaft connected to the second air moving device 220.

Referring again to FIGS. 2 and 3, the ignition system 400 is further comprised of a fuel nozzle 405, an ignition source 410, and a mist diffuser 415. In a preferred embodiment, the ignition source 410 is a spark plug. Other ignition sources can be used, including, but not limited to, a piezoelectric igniter, a hot surface igniter or an ignition transformer igniter. Fuel is supplied to the ignition system 400 by a fuel line that is supplied from the fuel tank 125. Fuel exits the fuel line through the fuel nozzle 405, which is directed into the mist diffuser 415 where it creates an air-fuel mixture. The air-fuel mixture is exposed to the ignition source 410 as the air-fuel mixture is ejected into the combustion chamber 500.

The forced air heater ignition system 400 also comprises a photo cell 420 and a thermal sensor 425, both of which are associated with the combustion chamber 500 to detect chamber temperatures. The thermal sensor 425 can comprise an overheating sensor, such as a bimetallic thermal switch. In the event that the photo cell 420 is unable to detect the presences of a flame in the combustion chamber, the forced air heater will shut off. Similarly, the thermal sensor 425 will detect the temperature in the combustion chamber. In the event that the combustion chamber 500 overheats, the forced air heater 100 will shut off.

Returning to FIG. 2, there is also shown an embodiment of the fuel supply system 300 and its incorporation into the forced air heater 100. The fuel is pumped out of the fuel tank 125 to the ignition system 400 by a fuel supply system 300 via the fuel line 305. The fuel line 305 is interrupted by an adjuster 320, which is a controller that can be manipulated by a user to adjust the amount of fuel flow from the fuel supply system 300 to the ignition system 400. The amount of fuel supplied to the pump 360 can be increased or decreased via the heat capacity adjuster 320. The heat capacity adjuster 320 can include a printed circuit board that controls the pump. An ignition button 315 can also be provided.

Figure 4B:
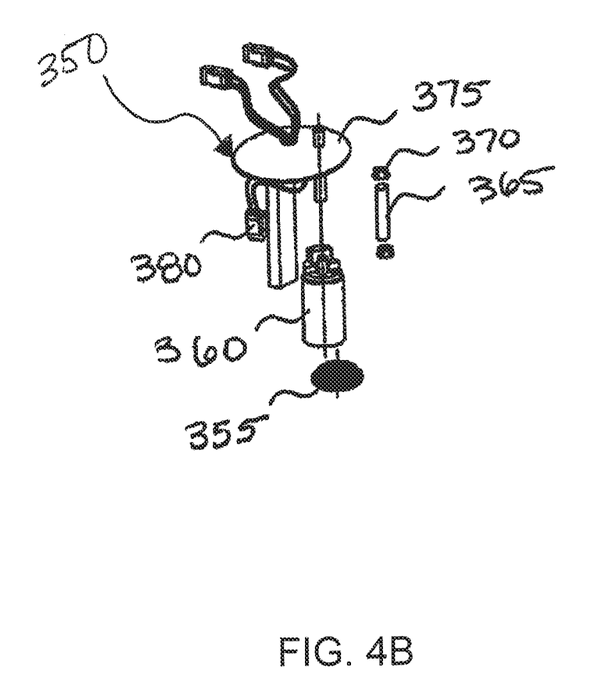
FIG. 4B is an exploded view of an in tank fuel pump system suitable for use with the heater of FIG. 1.

Referring now to FIG. 4B, there is shown an exploded view of the fuel supply system 300. The fuel supply system 300 comprises a fuel pump assembly 350 and the fuel line 305 (shown in FIG. 2). The fuel pump assembly 350 is further comprised of a fuel strainer 355, a fuel pump 360, a fuel tube 365, a fuel tube band 370, a fuel pump bracket 375 and a power connector 380. The fuel strainer 355 is attached to the bottom of the fuel pump 360. The fuel tube 365 is located inside of the fuel pump 360 and both the fuel pump 360 and the fuel tube 365 are connected to a fuel pump bracket 375. The fuel tube band 370 serves as a fastener between the fuel tube 365 and the fuel pump bracket 375, while the fuel pump 360, itself, connects to the fuel pump bracket 375. The fuel pump assembly 350 is submergible inside the fuel tank 125. The pump 360 requires power to operate, which is facilitated by the power connector 380 that is connected to a power source, such as battery 605. When connected to the fuel pump 360, the power connector 380 forms a liquid-tight seal. In an alternative embodiment of the fuel supply system 300, a high pressure pump can be used to pump fuel from the fuel tank 125 to the ignition system.

Figure 5:
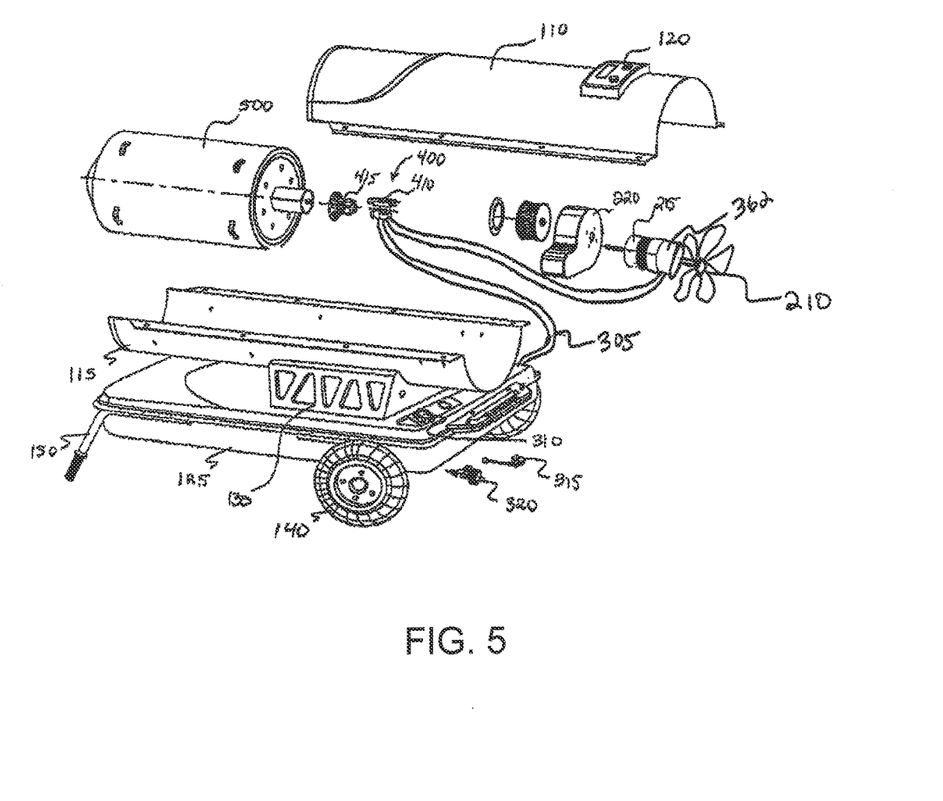
FIG. 5 is an exploded view of a heater according to the invention with an external fuel pump.
Figure 7:
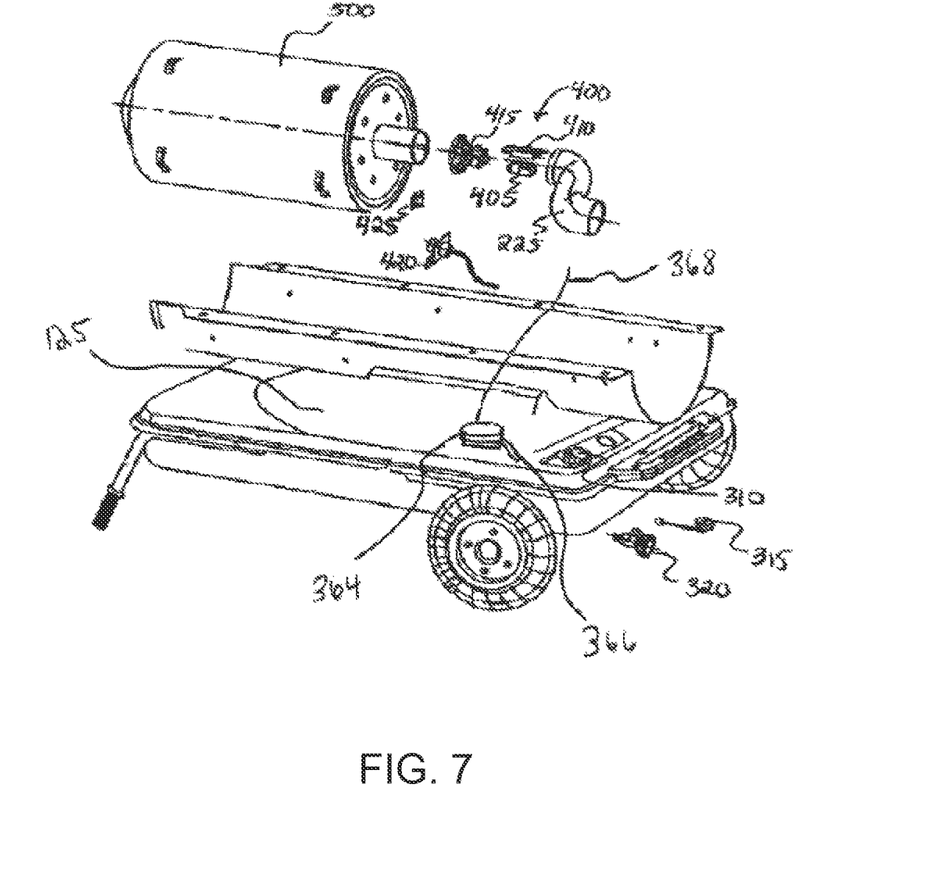
FIG. 7 is a perspective view of a heater including a mechanical pump.

In another embodiment, shown in FIG. 5, the fuel supply system 300 includes a commonly known centrifugal or vane pump 362 that is external to the fuel tank 125. In this embodiment, the pump 362 is located adjacent to the motor 215 and is powered by the motor 215. The pump 362 is provided with a suction line that connects to the ignition system 400. The pump 362 provides suction that draws fuel from the fuel tank 125 via the fuel line 305 into the ignition system 400. In another embodiment, shown in FIG. 7, the fuel supply system 300 can include a mechanical pump 364. The mechanical pump 364 is positioned directly above the fuel tank 125 and includes a suction line 366 in the fuel tank 125. The mechanical pump 364 draws fuel from inside the tank 125 and a fuel supply line 368 that connects to the ignition system 400.

Figure 6:
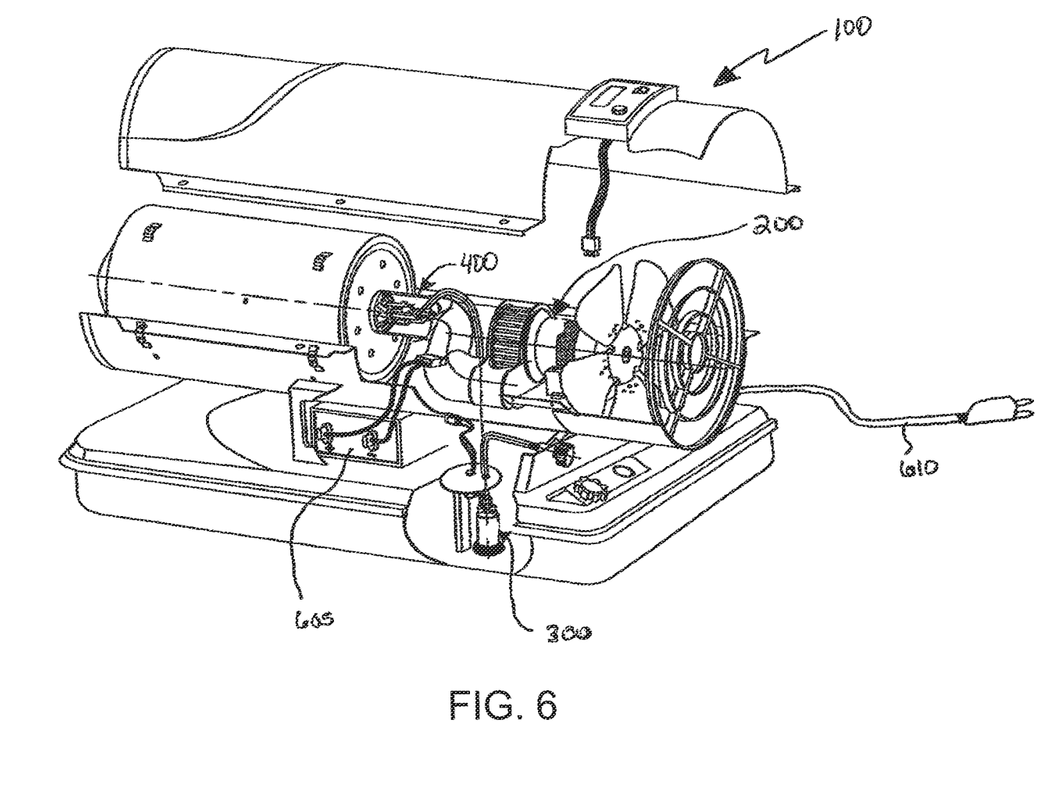
FIG. 6 is an exploded view illustrating more details of a forced air heater according to the invention with an on board battery power source.

Referring now to FIG. 6, there is shown an embodiment of the forced air heater 100 that is capable of battery operation. While forced air heaters typically operate on AC power, an embodiment of the device preferably uses a rechargeable battery 605 with a charging system, whereby the battery is recharged each time the heater 100 is plugged into an AC power source. The device can incorporate an AC to DC converter and a DC to AC inverter, thus either power source—AC or DC—can power the heater 100.

Embodiments

The following list includes particular embodiments of the present invention. The list, however, is not limiting and does not exclude alternate embodiments, as would be appreciated by one of ordinary skill in the art.

1. A forced air heater comprising:
an outer housing having interior and exterior surfaces and first and second axial ends;
a combustion chamber positioned within the housing with an annular space defined between the interior surface of the housing and the combustion chamber;
an ignition system within the combustion chamber;
a first air mover that draws air in from the first axial end of the outer housing, through the annular space and towards the second axial end of the outer housing;
a second air mover that directs air to the ignition system;
a fuel source; and
a fuel supply system that provides fuel to the ignition system.

2. The heater of embodiment 1 wherein the first air mover is a blade fan and the second air mover is a cage blower.

3. The heater of any one or more of embodiments 1-2 wherein the second air mover includes an inlet port for drawing air into the second air mover, and an outlet port that is connected configured to a central portion of the combustion chamber.

4. The heater of any one or more of embodiments 1-3 wherein the first and second air movers are driven by a common motor.

5. The heater of any one or more of embodiments 1-4 wherein a common shaft extending through the common motor is connected to the first and second air movers.

6. The heater of any one or more of embodiments 1-5 wherein the first and second air movers are connected on opposite sides of the motor.

7. The heater of any one or more of embodiments 1-6 wherein a clutch assembly is associated with at least one of the first and second air movers.

8. The heater of any one or more of embodiments 1-7 wherein the motor is a variable speed motor.

9. The heater of any one or more of embodiments 1-8 wherein the ignition system is further comprised of a fuel nozzle, an ignition source, and a mist diffuser.

10. The heater of any one or more of embodiments 1-9 wherein the ignition source is a spark plug.

11. The heater of any one or more of embodiments 1-10 wherein the heater is adapted for operating on AC or DC power.

12. The heater of any one or more of embodiments 1-11 wherein the fuel system includes a submerged pump.

13. The heater of any one or more of embodiments 1-12 wherein the fuel system includes an external pump selected from the group comprised of a vane pump, a centrifugal pump, and a mechanical pump.

14. The heater of any one or more of embodiments 1-13 wherein the pump is powered by the motor.

15. The heater of any one or more of embodiments 1-14 wherein the fuel system includes an adjuster for altering the fuel supply.

16. The heater of any one or more of embodiments 1-15 wherein the first and second air movers are independently adjustable.

17. The heater of any one or more of embodiments 1-16 wherein the heater includes a thermal sensor.

18. A forced air heater comprising:
an outer housing having interior and exterior surfaces and first and second axial ends;
a combustion chamber positioned within the housing with an annular space defined between the interior surface of the housing and the combustion chamber;
an ignition system within the combustion chamber;
a first air mover that is located within the outer housing and draws air in from the first axial end of the outer housing, through the annular space and towards the second axial end of the outer housing;
a second air mover that is located in the outer housing and directs air to the ignition system;
a fuel source; and
a fuel supply system that includes a submerged pump provides fuel to the ignition system.

19. A forced air heater comprising:
an outer housing having interior and exterior surfaces and first and second axial ends;
a combustion chamber positioned within the housing with an annular space defined between the interior surface of the housing and the combustion chamber;
an ignition system within the combustion chamber;
a first air mover that is located within the outer housing and draws air in from the first axial end of the outer housing, through the annular space and towards the second axial end of the outer housing;
a second air mover that is located in the outer housing and directs air to the ignition system;
a fuel source; and
a fuel supply system that includes an external mechanical pump provides fuel to the ignition system.

20. A forced air heater comprising:
an outer housing having interior and exterior surfaces and first and second axial ends;
a combustion chamber positioned within the housing with an annular space defined between the interior surface of the housing and the combustion chamber;
an ignition system within the combustion chamber;
a first air mover that draws air in from the first axial end of the outer housing, through the annular space and towards the second axial end of the outer housing;
a second air mover that directs air to the ignition system;
a motor that is connected to the first and second air movers by a common shaft;
a fuel source; and
a fuel supply system that provides fuel to the ignition system.

Further embodiments herein may be formed by supplementing an embodiment with one or more element from any one or more other embodiment herein, and/or substituting one or more element from one embodiment with one or more element from one or more other embodiment herein.

Having thus described various embodiments of the present invention in detail, it is to be appreciated and will be apparent to those skilled in the art that many physical changes, only a few of which are exemplified in the detailed description above, could be made in the device without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A forced air heater comprising:
   an outer housing having interior and exterior surfaces and first and second axial ends;
   a combustion chamber positioned within the housing with an annular space defined between the interior surface of the housing and the combustion chamber;
   an ignition system within the combustion chamber;
   a blade fan at the first axial end of the outer housing that draws air into the housing from said first axial end of the outer housing, and then through the annular space and out the second axial end of the outer housing;
   a squirrel cage blower within the outer housing which draws a portion of the air introduced into the housing by the blade fan and blows it directly into the combustion chamber;
   a fuel source; and
   a fuel supply system with a fuel pump that pumps fuel to a nozzle which delivers it directly into the combustion chamber without combining it with air in the nozzle;
   wherein the blade fan and the squirrel cage blower are driven by a common motor.

2. The heater of claim 1 wherein the squirrel cage blower includes an inlet port for drawing air into the squirrel cage blower, and an outlet port that is connected to a central portion of the combustion chamber.

3. The heater of claim 1 wherein the fuel pump is a submerged pump and a common drive shaft extends through the common motor and is connected to the blade fan and the squirrel cage blower.

4. The heater of claim 3 wherein the motor has a drive shaft which is aligned with the axis of the outer housing and which extends through the motor, and the drive shaft drives the squirrel cage blower through a clutch assembly.

5. The heater of claim 1 wherein the motor is a variable speed motor.

6. The heater of claim 1 wherein the ignition system is further comprised of a mist diffuser for creating a fuel-air mixture and an ignition source for igniting the fuel-air mixture.

7. The heater of claim 6 wherein the ignition source is a spark plug.

8. The heater of claim 1 wherein the heater is adapted for operating on AC or DC power.

9. The heater of claim 1 wherein the fuel system includes an adjuster for altering the fuel supply.

10. The heater of claim 1 wherein the blade fan and the squirrel cage blower are independently adjustable.

11. The heater of claim 1 wherein the heater includes a thermal sensor.

* * * * *